Dec. 20, 1960   W. D. SCOTT ET AL   2,965,071
ANIMAL CRADLE
Filed July 24, 1958

Inventors:
William David Scott
John William Gaffney
Arthur Marcus Bickford
by Howson & Howson Attys.

+
United States Patent Office 2,965,071
Patented Dec. 20, 1960

2,965,071
ANIMAL CRADLE

William David Scott, White Cedars, Cooyal, via Mudgee; John William Gaffney, Kemp's Valley, Cooyal, via Mudgee; and Arthur Marcus Bickford, 48 Anzac Ave., Collaroy, near Sydney, all of New South Wales, Australia Filed July 24, 1958, Ser. No. 750,662

3 Claims. (Cl. 119—103)

This invention has been devised to provide a cradle for holding animals, for example pigs and sheep, on their backs to enable such attention to be given to them as requires the animal to be so positioned.

A feature of the invention is the ease with which an animal can be placed on the cradle and securely held.

This animal cradle consists of a trough having a rail juxtaposed each side thereof. A pair of straps slidably attached to one of the rails pass over the top of the trough and between said trough and the other rail. Means are included to tauten the straps over an animal on the cradle and other means are included to hold the straps when tautened.

Figure 1:
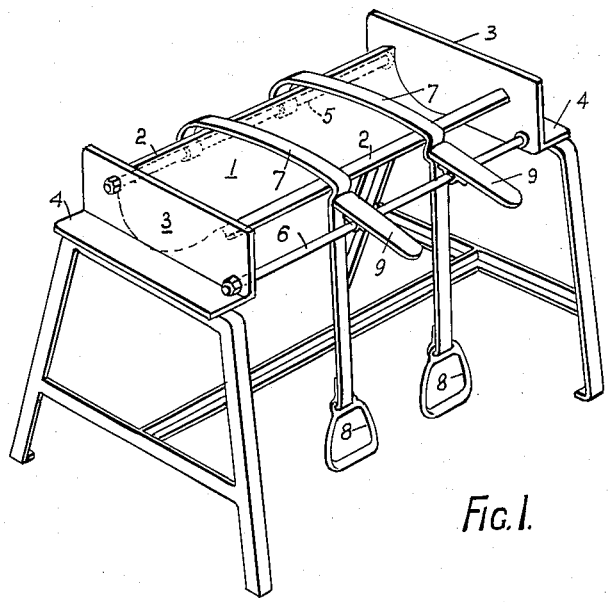
Figure 2:
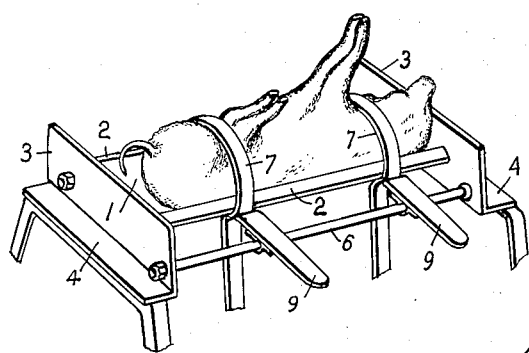
Figure 3:
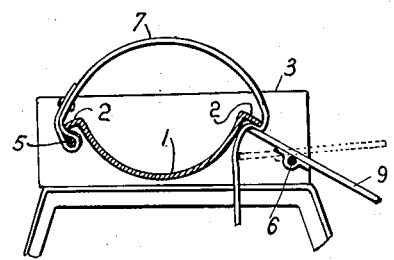

One embodiment of the invention is described with reference to the annexed drawings wherein:

Fig. 1 is a perspective view of the cradle;
Fig. 2 is a similar view with an animal strapped therein;
Fig. 3 is a transverse sectional elevation of the cradle.

As illustrated the cradle consists of an arcuate trough 1 having the longitudinal edges 2 flanged outwardly and downwardly acutely. End plates 3 fixed to the trough have a flange 4 on the bottom whereby the trough is fixed on a table or other base. The rails 5 and 6 are fixed in the end plates 3.

A pair of straps 7 are slidably attached to rail 5; they pass over the top of the trough and an animal placed therein and between the trough and the rail 6. The rail 6 is loacted away from the trough sufficiently to permit free passage of the straps. Each strap has a stirrup 8 therein which constitute the strap tautening means.

A pair of levers 9 are slidably fulcrumed on the rail 6. The levers are arranged to be manipulated by hand to jamb the respective straps against the side of the trough under the adjacent flanged edge 2 and so hold an animal in the trough. The stirrups 8 enable the straps to be pulled by the foot of an operator while he is holding an animal on the cradle and to maintain the straps tautened while he is adjusting the holding levers.

We claim:

1. A cradle for holding an animal on its back, said cradle consisting of a trough having a rail juxtaposed each side thereof, at least one strap slidably attached to one of said rails and passed over the top of the trough and between said trough and the other rail and having a free terminal end depending therefrom, means at said terminal end to tauten said straps over an animal on said cradle and lever means on said other rail holding said straps when tautened.

2. A cradle for holding an animal on its back, said cradle consisting of an arcuate trough having a rail juxtaposed each side thereof, at least one strap slidably attached at one end to one of said rails and passed over the top and between said trough and said other rail and having a free terminal end portion depending therefrom, means on said terminal portion to tauten said strap over an animal on said cradle, at least one lever slidably fulcrumed on said last mentioned rail, the free end of said lever engaging said strap and jambing said strap against the side of the cradle and hold said strap firmly in place over the body of the animal.

3. A cradle for holding an animal on its back according to claim 1 wherein a stirrup is suspended from the terminal end of said strap to thereby serve as said tautening means.

References Cited in the file of this patent
UNITED STATES PATENTS

| | | |
|---|---|---|
| 1,055,953 | Tanabe | Mar. 11, 1913 |
| 2,279,012 | Packchanian | Apr. 7, 1942 |
| 2,705,475 | Johnisee | Apr. 5, 1955 |
| 2,789,538 | Merritt | Apr. 23, 1957 |